United States Patent
Arzuaga et al.

(10) Patent No.: US 9,422,479 B2
(45) Date of Patent: Aug. 23, 2016

(54) SHIFTING MECHANISMS FOR FLUID JET DECOKING TOOLS

(71) Applicant: Flowserve Management Company, Irving, TX (US)

(72) Inventors: Daniel O. Arzuaga, Hermosa Beach, CA (US); Jagadish Janardhan, Fullerton, CA (US)

(73) Assignee: Flowserve Management Company, Irving, TX (US)

( * ) Notice: Subject to any disclaimer, the term of this patent is extended or adjusted under 35 U.S.C. 154(b) by 264 days.

(21) Appl. No.: 14/088,895

(22) Filed: Nov. 25, 2013

(65) Prior Publication Data

US 2014/0076987 A1  Mar. 20, 2014

Related U.S. Application Data

(63) Continuation-in-part of application No. 13/367,706, filed on Feb. 7, 2012, now Pat. No. 9,175,225.

(60) Provisional application No. 61/440,182, filed on Feb. 7, 2011.

(51) Int. Cl.
  *C10B 33/00* (2006.01)
  *C10B 41/02* (2006.01)
  *F16K 31/04* (2006.01)

(52) U.S. Cl.
  CPC .............. *C10B 33/006* (2013.01); *C10B 41/02* (2013.01); *F16K 31/041* (2013.01); *Y10S 239/10* (2013.01)

(58) Field of Classification Search
  CPC ...... C10B 33/006; C10B 41/02; Y10S 239/13
  USPC ........... 239/442, 443, 447, DIG. 13; 202/241; 137/625.11, 625.15
  See application file for complete search history.

(56) References Cited

U.S. PATENT DOCUMENTS

| 4,611,613 | A  | 9/1986  | Kaplan          |
|-----------|----|---------|-----------------|
| 4,738,399 | A  | 4/1988  | Adams           |
| 5,794,729 | A  | 8/1998  | Van Meter et al.|
| 6,644,567 | B1 | 11/2003 | Adams et al.    |
| 7,163,165 | B2 | 1/2007  | Paul et al.     |
| 7,473,337 | B2 | 1/2009  | Lah             |

(Continued)

OTHER PUBLICATIONS

Final Office Action pertaining to U.S. Appl. No. 13/367,706, dated Feb. 4, 2015.

(Continued)

*Primary Examiner* — Len Tran
*Assistant Examiner* — Alexander Valvis
(74) *Attorney, Agent, or Firm* — Dinsmore & Shohl LLP

(57) ABSTRACT

A mode shifting apparatus for a decoking tool. A diversion plate can be used to provide selective delivery of a pressurized decoking fluid to one or the other of nozzles in the tool. The mode shifting apparatus can be used to switch between a cutting mode of operation and a drilling mode of operation by rotation of the diversion plate, where a biasing force causes the diversion plate to unseat itself from an adjacent surface of the tool in order to reduce friction forces between them. The diversion plate may be temporarily unseated from an adjacent surface of the mode shifting apparatus prior to relative rotation between them such that both rotationally-induced forces and the need for relying upon a lubricating fluid to achieve damping between adjacent component surfaces may be reduced.

9 Claims, 11 Drawing Sheets

(56) References Cited

U.S. PATENT DOCUMENTS

| | | |
|---|---|---|
| 7,819,343 B2 | 10/2010 | Paul et al. |
| 8,002,204 B2 | 8/2011 | Paul et al. |
| 8,066,334 B2 | 11/2011 | Paul et al. |
| 2002/0170814 A1 | 11/2002 | Lah |
| 2007/0084714 A1 | 4/2007 | Lah |
| 2009/0165617 A1 | 7/2009 | Paul et al. |
| 2009/0165618 A1 | 7/2009 | Paul et al. |

OTHER PUBLICATIONS

Office Action Pertaining to U.S. Appl. No. 13/367,706, dated Nov. 17, 2014.

Notice of Allowance dated Jul. 15, 2015 pertaining to U.S. Appl. No. 13/367,706.

SHIFTING MECHANISMS FOR FLUID JET DECOKING TOOLS

CROSS-REFERENCE TO RELATED APPLICATIONS

This application is a continuation-in-part of co-pending application Ser. No. 13/367,706 filed Feb. 7, 2012 which claims the benefit of U.S. Provisional Application No. 61/440,182, filed Feb. 7, 2011, entitled "IMPROVED AUTO-SHIFT MECHANISM FOR A FLUID JET DECOKING TOOL."

TECHNICAL FIELD

The embodiments described herein generally relate to devices for removing coke from containers such as coking drums used in oil refining, and more specifically to devices for shifting between nozzle modes in a decoking tool used in oil refining coke drums.

BACKGROUND

In conventional petroleum refining operations, crude oil is processed into gasoline, diesel fuel, kerosene, lubricants or the like. It is a common practice to recover heavy residual hydrocarbon byproducts through a thermal cracking process known as delayed coking. In a delayed coker operation, heavy hydrocarbon (oil) is pumped through furnaces wherein it is heated to a high temperature (for example, between 900° F. and 1000° F.) on its way to cylindrical vessels known as coke drums which are as large as 30 feet in diameter and 140 feet in height, and typically configured to operate in pairs. While in the coke drum, the heated oil releases its valuable hydrocarbon vapors which are then sent to distilling towers where they form condensate (including, among other things, gas, naphtha and gas oils) which can be further processed into more useful products, leaving behind, through the combined effect of temperature and retention time, solid petroleum coke. This coke residue must be broken up in order to remove it from the vessel, and is preferably accomplished by using a decoking (or coke cutting) tool in conjunction with a decoking fluid, such as high pressure water.

Such a tool can include a number of nozzles for removing coke such as, for example, a drill bit with both drilling and cutting nozzles. The decoking tool can be lowered into the vessel through an opening in the top of the vessel, and the high pressure water supply can be introduced into the decoking tool to supply decoking fluid to the desired nozzles of the decoking tool.

Early versions of shifting between the cutting and drilling nozzles were accomplished manually. Some automatic shifting mechanisms can be shifted via the pressurization and depressurization cycle of decoking fluid. However, such automatic shifting may cause excessive wear on the sliding surfaces of the mechanism that may lead to inaccurate shifting. Accordingly, a need exists for alternative mode-shifting apparatuses for use in a fluid jet decoking tool.

SUMMARY

In one embodiment, a mode-shifting apparatus for use in a fluid jet decoking tool may include a diversion plate, a control rod, a shifting mechanism, and a biasing member. The diversion plate can be configured to provide selective fluid communication between a source of pressurized decoking fluid and a first nozzle and a second nozzle. The diversion plate can define a tool-engaging surface thereon. The control rod can be coupled to the diversion plate. The shifting mechanism can be cooperative with the diversion plate through the control rod such that a change in decoking fluid pressure imparted to the shifting apparatus produces selective rotary movement in the diversion plate through the control rod. The biasing member can be responsive to changes of the decoking fluid pressure such that the biasing member is configured to temporarily unseat the tool-engaging surface of the diversion plate from an adjacent surface of a decoking tool during the change in the decoking fluid pressure. The biasing member can maintain the diversion plate and the decoking tool in a state of separation during at least a portion of a time prior to relative rotary movement.

In another embodiment, a mode-shifting apparatus for use in a fluid jet decoking tool may include a diversion plate, a control rod, a shifting mechanism, and a biasing member. The diversion plate may be configured to provide selective fluid communication between a source of pressurized decoking fluid and a first nozzle and a second nozzle. The diversion plate can define a tool-engaging surface thereon. The control rod can be coupled to the diversion plate. The control rod may include a ratcheting mechanism. The shifting mechanism may include an actuator sleeve engaged with the ratcheting mechanism of the control rod. The actuator sleeve can be engaged with an actuator pin carrier that is biased axially by a shift biasing member. A change in decoking fluid pressure imparted to the shifting apparatus can produce selective rotary movement in the diversion plate through the control rod. The biasing member can be responsive to changes of the decoking fluid pressure such that the biasing member is configured to temporarily unseat the tool-engaging surface of the diversion plate from an adjacent surface of a decoking tool during the change in the decoking fluid pressure. The biasing member can maintain the diversion plate and the decoking tool in a state of separation during at least a portion of a time prior to relative rotary movement.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION OF THE PREFERRED EMBODIMENTS

Figure 1:
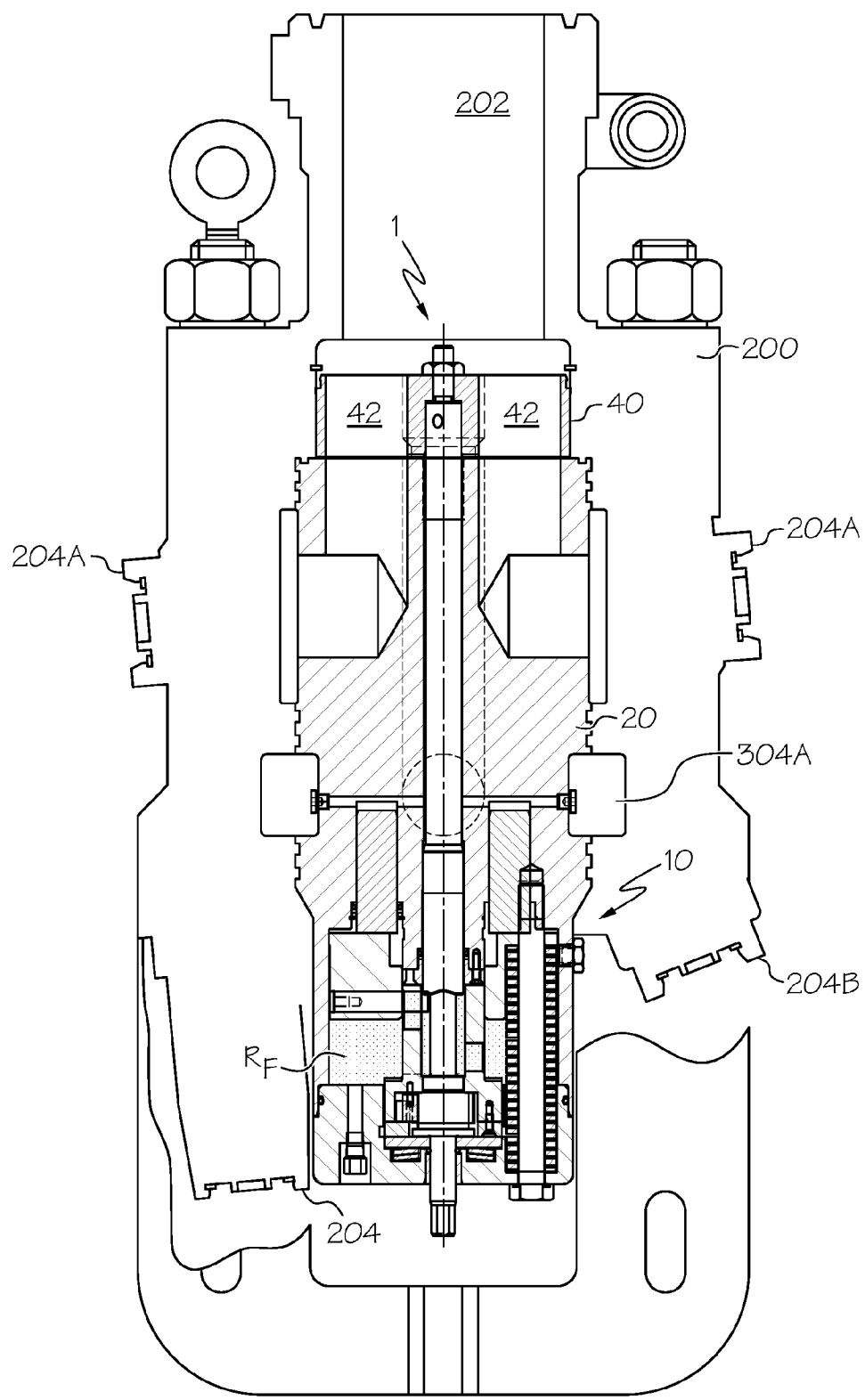
FIG. 1 schematically depicts a cutaway view of a decoking tool with a mode shifting apparatus according to one or more embodiments shown and described herein.

Referring generally to FIG. 1, a portion of a decoking tool 200 is schematically depicted. The decoking tool 200 can comprise a fluid delivery path 202 for supplying decoking fluid to one or more cutting nozzles 204A or boring nozzles 204B via a mode-shifting apparatus 1. Accordingly, the mode-shifting apparatus 1 can be operated to selectively direct decoking fluid to any of the one or more cutting and boring nozzles 204A, 204B. Shifting mechanisms such as, for example, an AutoShift™ by Flowserve Corporation of Irving, Tex., USA, can be used to selectively direct the flow to the desired cutting nozzles, i.e., either the cutting nozzles or the drilling nozzles, depending on which part of the decoking operation the tool is in at that time. Specifically, decoking fluid can be pressurized and made to pass through one or more of the nozzles 204A, 204B in response to one or the other of a drilling mode of operation or a cutting mode of operation. Details pertaining to nozzle and channel placement and operation can be seen in U.S. Pat. No. 6,644,567 that is owned by the Assignee of the present application and the pertinent portions of which are incorporated herein by reference.

Referring collectively to FIGS. 2A-4D, views corresponding to the mode-shifting apparatus 1 being in various stages of pressurization are shown. In one embodiment, the mode-shifting apparatus 1 can comprise delivery channels 22A, 22B for the flow of decoking fluid through the diversion body 20 and to the nozzle sets. For example, the channels 22A can be diametrically opposed to one another about the axial dimension of a diversion body 20 to promote fluid communication between the decoking fluid that enters a perforate diversion plate 40 through axial passageways 42 and the cutting nozzles 304A, while another set of channels 22B can be used to promote fluid communication between the decoking fluid that enters the diversion plate 40 through axial passageways 42 and the boring nozzles 304B; as with the first channels 22A, the second channels 22B can be placed diametrically opposed to one another in diversion plate 40. The axial channels 22A, 22B can terminate at an upper surface 24 of the diversion body 20. A biasing apparatus 10 can be formed into or mounted onto a lower portion of a diversion body 20 of mode-shifting apparatus 1. According to the embodiments described herein, the mode-shifting apparatus 1 can be outfitted with any number of passageways and corresponding channels for supplying pressurized fluid to any number of nozzles; the present embodiment shows two of each. The passages can be configured such that pressurized fluid traversing the upper surface 24 of the diversion body 20 can directed any subset of the one or more nozzles 204A, 204B (FIG. 1). Moreover, at least one of the fluid passageways formed by the cooperation of axial passageways 42 and channels 22A, 22B can be used such that upon delivery of the decoking fluid through the respective channel (presently shown as channel 22B), fluid communication is established such that the fluid can be used to impart pressure to the surfaces of other components (such as piston 140 mentioned below in conjunction with FIGS. 2A, 3A and 4A) to facilitate selective movement of such components.

A control rod (also referred to herein as diversion plate shaft, made up of a lower shaft and an upper shaft) 30 is a rotatable shaft that couples diversion plate 40 to the biasing apparatus 10 so that changes in pressure (i.e., depressurizations and repressurizations) applied to the biasing apparatus 10 can selectively cause the diversion plate 40 to rotate. Rotations of the diversion plate 40 can be utilized to switch between the aforementioned drilling and cutting modes, i.e., by selectively providing pressurized fluid to the desired passage of the diversion body 20. Control rod 30 may be made from an upper and lower portion that are joined together, or may be fabricated as a single piece.

As mentioned above, the diversion plate 40 can define a generally cylindrical shape about its axis of rotation R, and can include paired axial passageways 42 that terminate in apertures at the upper surfaces 44 and lower surfaces 46 of the diversion plate 40. In this way, the diversion plate 40 acts like a valve between fluid delivery path 202 (FIG. 1) and the drilling and cutting nozzle sets. Upon the proper degree of rotation (for example, ninety degrees in a diversion plate 40 configured with two such axial passageways 42 and corresponding apertures), a flowpath can be formed with the channels that lead to one or the other of the drilling and cutting nozzle sets. Thus, depending upon whether the mode-shifting apparatus 1 is supplying decoking fluid to a drilling mode or a cutting mode of operation, a pressurized source of decoking fluid that enters the top of diversion plate 40 is by the action of the biasing apparatus 10 routed to a corresponding set of drilling nozzles and cutting nozzles through axial passageways 42 and one or another set of channels.

Because of the decoking fluid pressures can be relatively high (e.g., thousands of pounds per square inch), a significant pressure differential can be formed across the portions of the diversion plate 40 that are used to block off the flow to the unused (and hence, relatively unpressurized) channels 22A, 22B. Even though the biasing apparatus 10 can be designed to accomplish shifting during the depressurized stage of operation to reduce frictional forces between them, such frictional contact may still be present (for example, between the lower surface 46 of the diversion plate 40 and the adjacent upper surface 24 of diversion body 20 of the decoking tool 200 that defines the channels 22A, 22B therein). The various aspects of the present disclosure can be used to reduce these frictional forces by lifting the diversion plate 40 away from the upper surface 24 of the diversion body 20 during transient and/or peak pressure conditions (e.g., as the pressure applied to the diversion plate 40 changes from a relatively high state to a relatively low state, as the pressure applied to the diversion plate 40 changes from a relatively low state to a relatively high state, when the pressure applied to the diversion plate 40 is at a relatively high state, when the pressure applied to the diversion plate 40 is at a relatively low state or changes to a relatively low state, or combinations thereof).

Figure 2A:
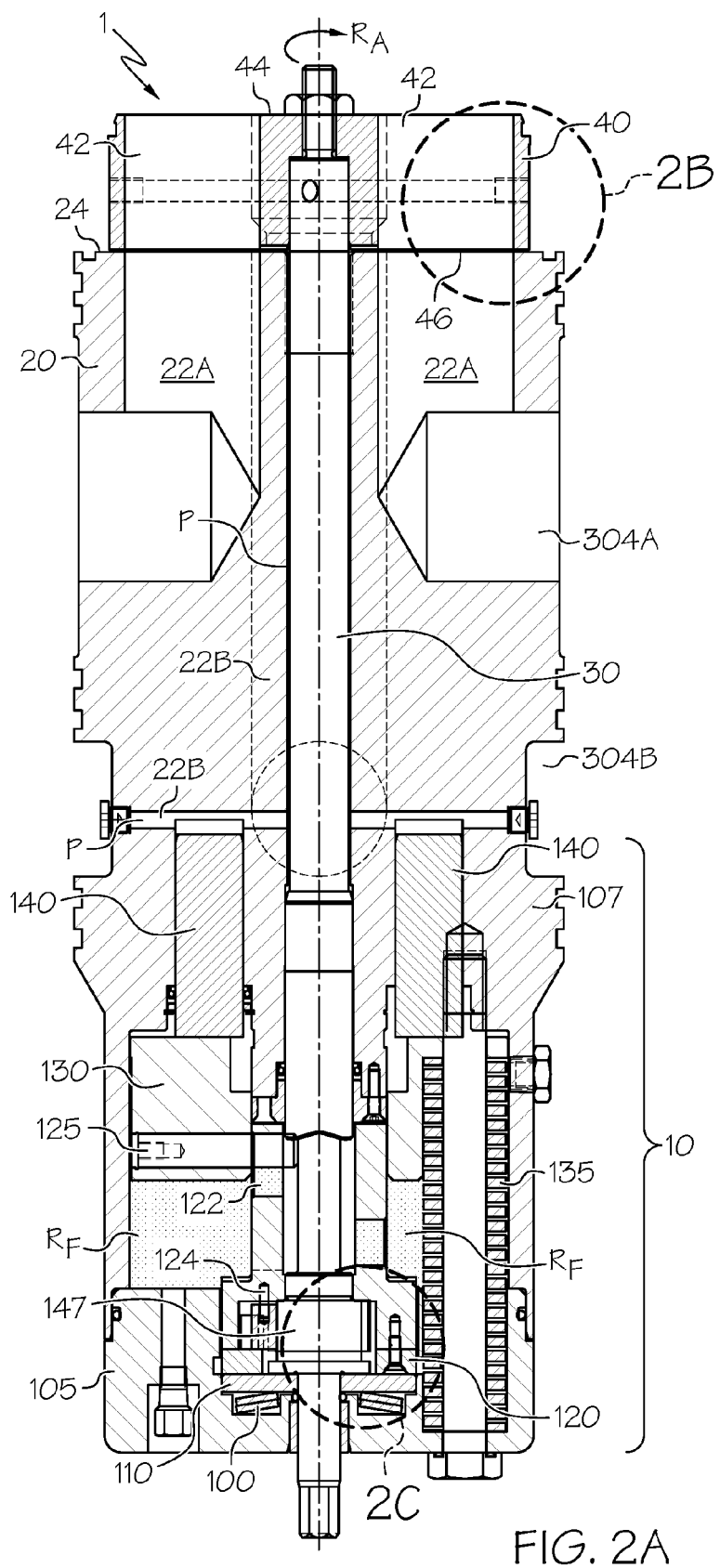
FIGS. 2A-2C schematically depicts the mode shifting apparatus of FIG. 1 in a depressurized state according to one or more embodiments shown and described herein.
Figure 2B:
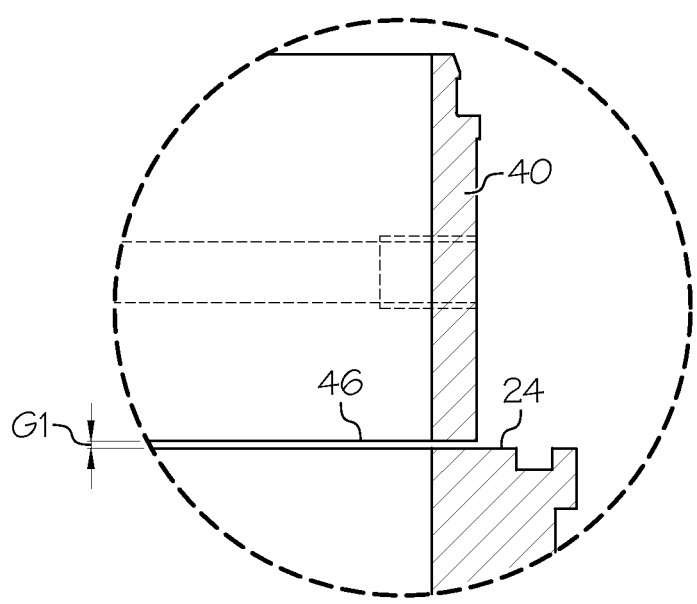
Figure 2C:
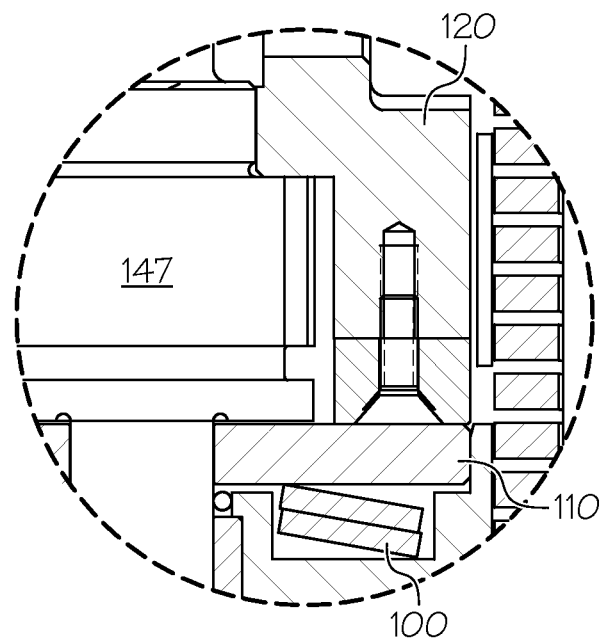

Referring collectively to FIGS. 2A-2C, in one embodiment, the biasing apparatus 10 can comprise one or more axial springs 100 (e.g., a biasing member) in the form of axially-aligned disks that are situated between and in contact with respective surfaces of a lower cover plate 105 and a control rod sleeve 110. The one or more axial springs 100 can bias the diversion plate 40 in an unseated position relative to mode-shifting apparatus 1. For example, as is depicted in FIG. 2B, the diversion plate 40 can be biased to an unseated position such that an axial clearance or gap G1 is formed between the upper surface 24 of the diversion body 20 and the lower surface 46 of diversion plate 40. The gap G1 can be any distance sufficient to physically separate the diversion body 20 from the diversion plate 40, i.e., the gap G1 places the diversion body 20 out of contact with the diversion plate 40. More particularly, the axial lift springs 100 cause the gap G1 to be of a magnitude compatible with the flow and pressure of the decoking fluid.

In order to place the diversion plate 40 in an unseated position with respect to the diversion body 20, the upper surface of the control rod sleeve 110 can be in axial contact with a lower surface of actuator sleeve 120 that defines a spiral groove 122 therein. An actuator pin (also called guide pin) 125 can be secured within an actuator pin carrier 130 such that the generally linear upward or downward movement of the actuator pin 125 can—through its cooperation with the spiral groove 122 formed about the rotational axis $R_A$ of the actuator sleeve 120—impart rotational movement to the actuator sleeve 120. Equally significant is that the actuator sleeve 120 is cooperative with the control rod 30 using a ratchet mechanism 147 that enables the sleeve 120 to selectively rotate the rod 30. Thus, the sleeve 120 is connected to the diversion plate 40 through a ratchet-pawl arrangement in ratchet mechanism 147, along with control rod (i.e., shaft) 30. In this way, the sleeve 120, control rod 30 and diversion plate 40 rotate in response to an increase in decoking fluid pressure being applied to the top surface of piston 140 (which would correspond to the generally downward movement of the actuating pin 125 and carrier 130 in response to the increase in fluid pressure) along with the radially spring-biased selective engagement of ratchet mechanism 147. Contrarily, only sleeve 120 rotates in response to a decrease in decoking fluid pressure being applied, as the ratchet mechanism 147 would disengage from the sleeve 120 to avoid clocking rotation of rod 30 and diversion plate 40. As such, rod 30 rotation about such an axis is in response to the axial downward movement of the actuator pin 125 as it traverses the spiral groove 122. Of course, depending on the orientation of the spiral groove 122 in conjunction with the ratchet mechanism 147, the desired rotational direction of the actuator sleeve 120, control rod 30 and diversion plate 40 can be made to proceed in either a clockwise or counterclockwise direction. In the present invention, by having the shifting preferably occur during pressurization, one particular advantage that may be realized is that reduced stiffness axial springs may be used.

The engagement of the ratchet mechanism 147 with pawl 124 that is coupled to the actuator sleeve 120 to selectively rotate the control rod 30 can ensure that the rotational force imparted to the actuator sleeve 120 by the actuator pin 125 is transmitted to the control rod 30 and the diversion plate 40 during the appropriate one of the pressurization and depressurization steps. Accordingly, the ratchet mechanism 147 can act as a positioning mechanism in cooperation with the control rod 30 to ensure precise clocking of the diversion plate 40 in the desired direction. For example, the diversion plate 40 can be clocked in ninety degree increments for a mode-shifting apparatus 1 with a pair of channels (such as channels 22A, 22B shown) for each of the drilling and cutting modes.

Moreover (as discussed above in conjunction with the orientation of the spiral grooves 122 in actuator sleeve 120), the ratchet mechanism 147 can be configured to cause the actuator sleeve 120 to engage the control rod 30 to when the actuator sleeve rotates in one direction and to not engage the control rod 30 when the actuator sleeve rotates in another direction. Accordingly, as mentioned above, the ratchet mechanism 147 can act to cause the control rod 30 to rotate during only one portion of the pressurization/depressurization cycle. Specifically, in situations where it is deemed preferable to have the diversion plate 40 rotate upon pressurization, the spiral grooves 122 could be placed in the actuator sleeve 120 in one orientation (for example, to define a right-handed helicoid) such that the upward movement of the actuator pin 125 that accompanies depressurization from the fluid pushes against an upper surface of the spiral groove 122. Likewise, if it were deemed preferable to have the diversion plate 40 rotate upon depressurization, the spiral grooves 122 could be placed in the actuator sleeve 120 to define a left-handed helicoid so that the downward movement of the actuator pin 125 that accompanies pressurization pushes against a lower surface of the spiral groove 122. It will be appreciated that irrespective of the direction of the spiral grooves 122 formed in the actuator sleeve, the orientation of the ratchet mechanism 147 ultimately determines when the rotation of the control rod 30 and diversion plate 40 takes place, as the engagement of spring-loaded pawls (not shown) with corresponding ratchet wheel teeth (not shown) of the ratchet mechanism 147 can be made to cooperate with one or the other of the aforementioned upward and downward movements that accompany fluid pressurization or depressurization. Furthermore, the configuration of the actuator sleeve 120 as having its spiral grooves 122 oriented within the actuator sleeve 120 as a right-handed helicoid or a left-handed helicoid is merely a matter of design preference to be chosen in conjunction with the orientation of ratchet mechanism 147.

As discussed above, it may be preferable to have the diversion plate 40 rotate upon pressurization (rather than upon depressurization). While ordinarily, such shift-upon pressurization may be rendered more difficult due to the increased frictional forces between the adjacent surfaces that are being forced to rotate relative to one another, the inclusion of the lifting effect of the axial springs 100—when used in conjunction with the remainder of the shifting mechanism 1 to produce aforementioned gap G1—helps to not only avoid wear on the diversion plate 40, but also can be used to counteract the effect of the pressurization, thereby providing much more precise control over the movement of the control rod 30 and diversion plate 40, which in turn can produce better control over the routing of the decoking fluid through one or both of the cutting and boring nozzles. Thus, shift during pressurization may be advantageous because the shifting springs 135 (also called shift biasing members, or more simply, biasing members) do not require extremely high stiffness, thereby lowering the forces on the actuator pin carrier 130 and actuator pin 125, which in turn enables easier design of the tool 1.

The one or more shifting springs 135 of the biasing apparatus 10 may be utilized to ensure that the actuator pin carrier 130 moves up when the pressure is reversed. In one embodiment, the one or more shifting springs 135 engage the lower cover plate 105 and a piston 140. The piston 140 can be engaged with the actuator pin carrier 130 such that the piston 140 and the actuator pin carrier 130 move contemporaneously. The one or more shifting springs 135 can exert a force upon the piston 140 such that the piston 140 and the actuator pin carrier 130 are biased away from the lower cover plate 105.

According to the embodiments described herein, the diversion plate 40 can be transitioned to an unseated position to create gap G1 between the diversion plate 40 and the diversion body 20 prior to rotating the diversion plate 40. Specifically, a portion of the decoking fluid can be utilized to apply a force upon the piston 140 in opposition to the one or more shifting springs 135. When the pressurizing force supplied by the decoking fluid is greater than the force supplied by the one or more shifting springs 135, the one or more shifting springs 135 can be compressed through the pressure imparted by the decoking fluid on piston 140. Conversely, when the pressurizing force supplied by the decoking fluid is less than the force supplied by the one or more shifting springs 135, the one or more shifting springs 135 can be decompressed by overcoming the decoking fluid pressure. Accordingly, the motion of the piston 140 and, thus, the actuator sleeve 120 can be controlled by the pressure of the decoking fluid with the shift-upon-pressurization or shift-upon-depressurization, as well as the direction of rotation, dictated by the configuration of the ratchet mechanism 147 and spiral groove 122 as discussed above.

In addition to causing selective rotation of the control rod 30, the actuator sleeve 120 (upon receipt of a downward force coming from actuator pin carrier 130 that is in turn responsive to the downward force imparted to it by piston 140 in a manner similar to—but separate from—that imparted to the shifting springs 135) can be configured to apply force to the axial springs 100. In one embodiment, the control rod sleeve 110 can be in axial contact with the actuator sleeve 120. The axial springs 100 can be disposed between the lower cover plate 105 and the control rod sleeve 110. Accordingly, the axial springs 100 can be compressed between and exert force upon the lower cover plate 105 and the control rod sleeve 110; it is these springs 100 that dictate whether a gap G1 is formed between the lower surface of the diversion plate 40 and the adjacent upper surface of the diversion body 20.

The control rod 30 can be configured to interact with the control rod sleeve 110. In one embodiment, the control rod 30 can comprise a collar portion 32 that engages with the control rod sleeve 110. Accordingly, control rod 30 and the control rod sleeve 110 can move contemporaneously. Specifically, as force exerted upon the control rod sleeve 110 in opposition to the force exerted upon the control rod sleeve 110 by the axial springs 100 increases, the axial springs 100 can be compressed and the control rod sleeve 110 can move towards the lower cover plate 105. Conversely, as force exerted upon the control rod sleeve 110 in opposition to the force exerted upon the control rod sleeve 110 by the axial springs 100 decreases, the axial springs 100 can be uncompressed, which in turn causes the control rod sleeve 110 to be upwardly moved away from the lower cover plate 105. In embodiments where the control rod 30 is engaged with the control rod sleeve 110, the axial position of the control rod 30 and thus, the gap G1 can be controlled by the axial position of the actuator sleeve 120.

As is noted above, the position of the actuator sleeve 120 can be controlled by the amount of pressure supplied by the decoking fluid. Moreover, in embodiments where the actuator sleeve 120 can engage the control rod sleeve 110, the axial position of the control rod 30 and the relative size of gap G1 can be controlled by the amount of pressure supplied by the decoking fluid.

By way of example, FIGS. 2A-2C depict the mode-shifting apparatus 1 in a relatively depressurized state. Specifically, a relatively low amount of pressure is supplied downwardly to the piston 140 from the decoking fluid such that upwardly-directed force from the axial springs 100 leaves them in a generally uncompressed state. Thus, the spring force supplied by the shifting spring (or springs) 135 is sufficient to maintain the piston 140 in a relatively high position, i.e., relatively close to a lower surface of the diversion body 20. Additionally, the actuator pin carrier 130 is at a relatively high position such that little (or no) downward force is applied by it to the actuator sleeve 120. Thus the axial springs 100—which are relatively unloaded in this state—have sufficient spring force to urge the control rod sleeve 110 and the actuator sleeve 120 upwards towards the shift body 107. Moreover, the axial springs 100 have sufficient spring force, in the relatively uncompressed state, to urge the control rod 30 vertically in order to form the gap G1 (shown with particularity in FIG. 2B) between the diversion plate 40 and the diversion body 20.

Figure 3A:
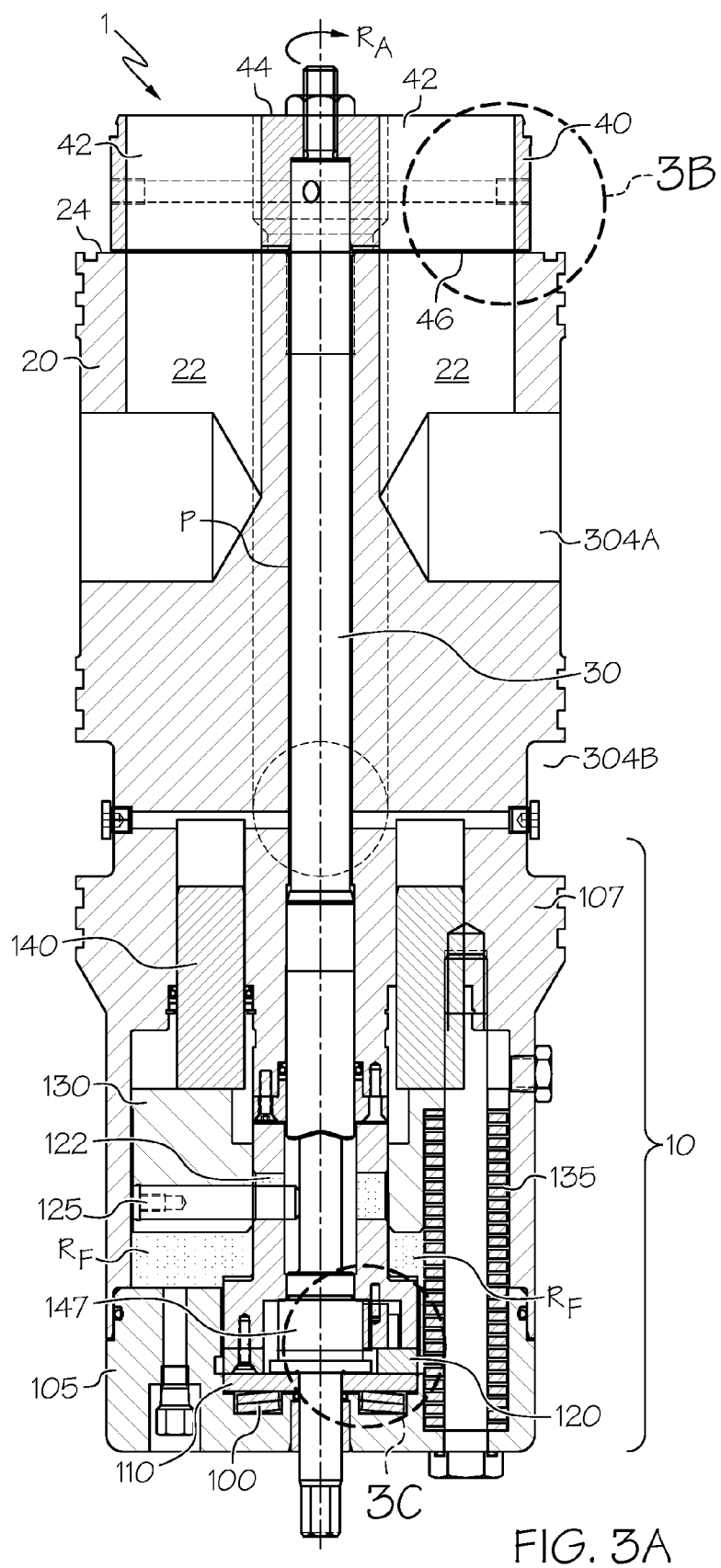
FIG. 3A-3C schematically depicts the mode shifting apparatus of FIG. 1 in a partially pressurized state according to one or more embodiments shown and described herein.
Figure 3B:
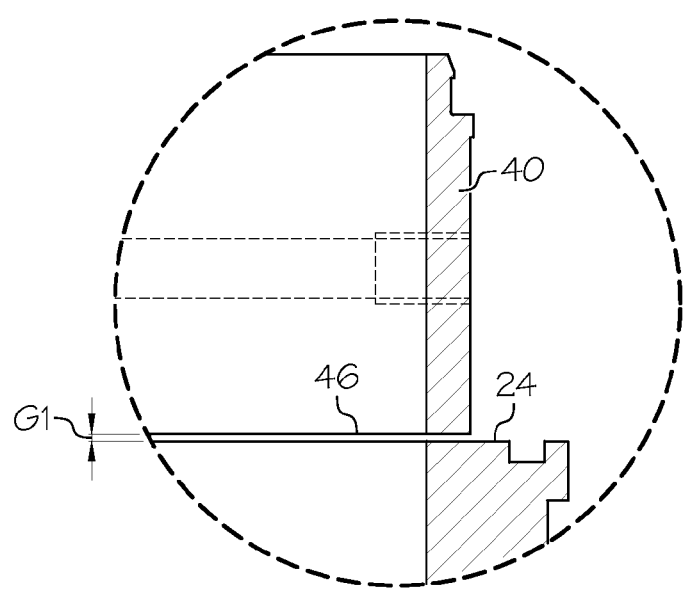
Figure 3C:
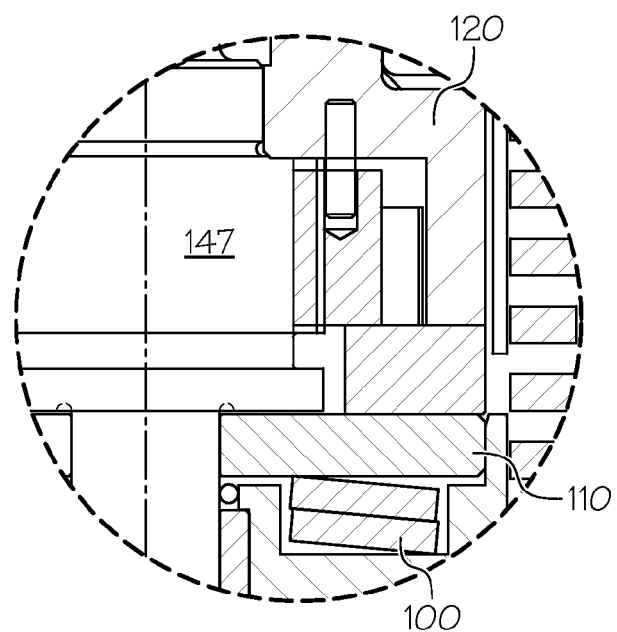

Likewise, FIGS. 3A-3C depict the mode-shifting apparatus 1 in a moderately pressurized state where the axial springs 100 transition from the relatively uncompressed state depicted in FIGS. 2A-2C to a state where they are relatively compressed by increasing the pressure on the piston 140 from the decoking fluid. Specifically, the piston 140 can be urged downward, which in turn pushes the actuator pin carrier 130 down while compressing the shifting spring 135. Such downward motion of the actuator pin carrier 130 can cause the actuator sleeve 120 to rotate under the influence of the actuator pin 125 interacting with the walls of the spiral groove 122 formed in the actuator sleeve 120. The control rod 30 can be rotated during this part of the pressurization cycle, i.e., as the pressure is increased. For example, the ratchet mechanism 147 can be configured to lock with the pawl 124 of the actuator sleeve 120 and cause the control rod 30 to rotate while gap G1 (which still briefly remains from the relatively uncompressed state depicted in FIGS. 2A-2C above) continues to separate the diversion plate 40 and the diversion body 20. Accordingly, the ratchet mechanism 147 can be configured to cause the control rod to rotate with the actuator sleeve 120 under an increase in pressure. In some embodiments, the spiral groove 122 formed in the actuator sleeve 120 can be configured to cause the diversion plate 40 to rotate in substantially equal increments such as, for example, in one embodiment about 90°.

While the one or more shifting springs 135 provide a strong bias against the actuator pin carrier 130 to maintain the actuator pin carrier 130 and actuator pin 125 at their topmost position, the one or more shifting springs 135 do not directly provide the lifting of the diversion plate 40 prior to and/or during the rotation that accompanies mode shifting. As discussed above, the axial springs 100 can supply sufficient spring force to form the gap G1 that separates the diversion plate 40 and the diversion body 20. Moreover, the pressure at which shifting occurs can be adjusted by varying the difference in spring constants of the one or more shifting springs 135 and the axial springs 100.

Figure 7A:
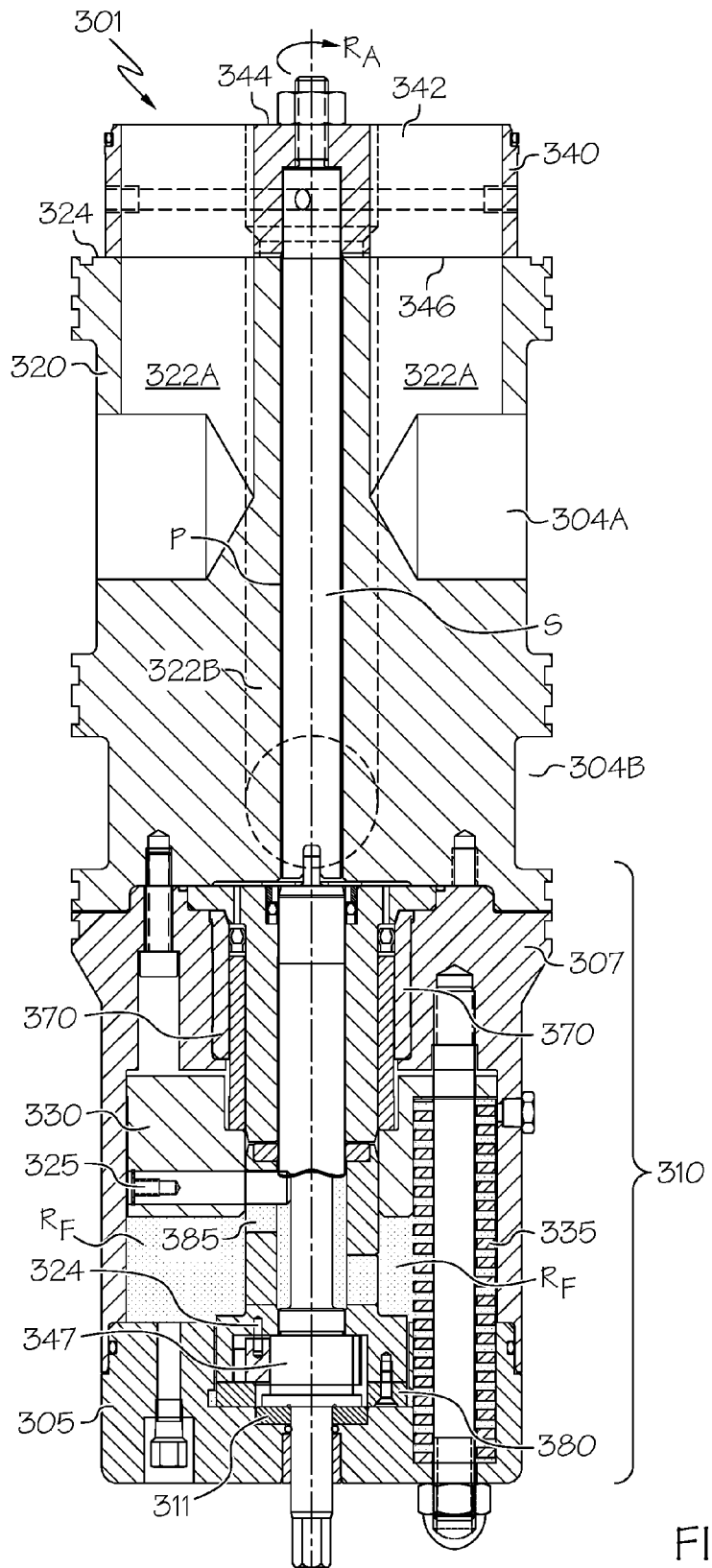
FIGS. 7A and 7B show the presence of oil as a damping fluid in two different operating states of a shifting apparatus according to the prior art.
Figure 7B:
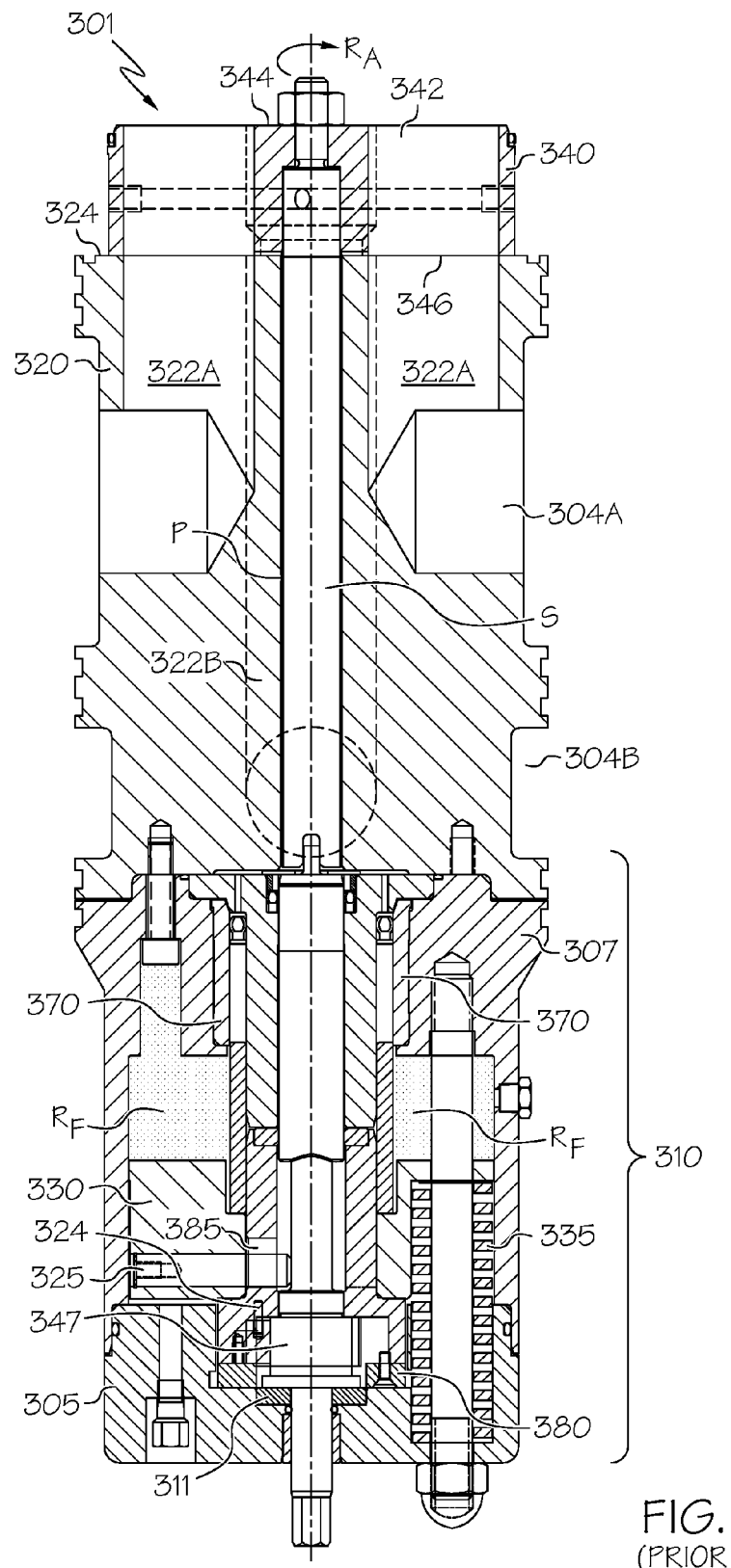

Referring next to FIGS. 7A and 7B in conjunction with the remaining drawings, a comparison between the oil-based damping approach of a prior art shifting apparatus 301 (for example, the current production AutoShift™ that is owned by the Assignee of the present invention) and the present invention (which avoids the use of oil for damping) is shown. The biasing apparatus 310 is mounted onto a lower portion of a diversion body 320 in a manner generally similar to that of FIG. 1. Note that in the device of the prior art, the diversion plate 340 is always in contact with the diversion body 320 through respective upper and lower contacting surfaces 346 and 324. As discussed below, the resulting high frictional forces help ensure that shifting preferably occurs only during depressurization (where such forces are significantly reduced). FIG. 7A shows the shifting apparatus 301 of the prior art in a low pressure state; this is evidenced by the pin carrier 330 occupying the vertical uppermost part of the cavity (or volumetric region $R_V$) formed in the biasing apparatus 310; in this state, the shift springs (i.e., shift biasing members, bias springs or the like) 335 are in a relatively uncompressed state. Oil (shown by the dotted pattern) substantially fills the volumetric region $R_V$ beneath the pin carrier 330 and the space surrounding the shift springs 335. The amount of oil used in volumetric region $R_V$ is greater than that needed for lubricating the various components of the biasing apparatus 310, in order to perform a damping function (described below). As with the present invention, pin 325 and pin carrier 330 traverse in a vertically up-and-down movement through cooperation with spiral actuator sleeve 380 and springs 335 in response to fluid pressure changes imparted to piston 370.

During pressurization (i.e., when the position of the pin 325 and pin carrier 330 go from the uppermost position in FIG. 7A to a lower position in FIG. 7B), the force of the increased fluid pressure is imparted to piston 370 that in turn pushes pin carrier 330 down to compress the shift springs 335. The one-way rotational nature of ratchet mechanism 347 is such that upon the pressurization step and its attendant downward movement of the pin 325 and pin carrier 330, the ratchet mechanism 347 does not permit a clocking movement present in the sleeve 380 to be imparted to the shaft S even though the downward movement by the pin carrier 330 and pin 325 causes sleeve 380 to rotate due to the pin-accepting path formed its spiraled groove 385. Thus, during pressurization, the diversion plate 340—which is in rotational cooperation with shaft S—does not turn, thereby keeping the fluid communication between the axial passageways 342 and one or the other of the cutting nozzles 304A or boring nozzles 304B unchanged.

During subsequent depressurization (i.e., away from the position of FIG. 7B to the position of FIG. 7A), the springs 335 want to expand and rotate the sleeve 380. It is noted that in the state depicted in FIG. 7B, the shift springs 335 are completely compressed and the oil is now on top of the pin carrier 330 within volumetric region $R_V$. Moreover, the pawl-based ratchet mechanism 347 allows engagement (i.e., mechanical coupling) between the diversion plate 340 (through upper and lower shaft S) and sleeve 380. Nevertheless, at the earliest stages of depressurization, the frictional forces between adjacent surfaces 346 and 324 of adjoining diversion plate 340 and diversion body 320 (due to the forces imparted to the former from the pressurized decoking fluid) is such that the sleeve 380, shaft S and diversion plate 340 are not yet permitted to rotate. As a result, the spiral cooperation between the sleeve 380 and the carrier 330 and the springs 335 prevents the assembly of these latter two to move up. As the pressure from the decoking fluid above continues to drop, the upward force in springs 335 is sufficient to overcome the fluid force, thereby loosening the connection and attendant surface friction between the diversion plate 340 and diversion body 320; such frictional reduction permits relative rotation between the diversion plate 340 and diversion body 320. Furthermore, once the springs 335 start expanding, they are able to accelerate the upward motion of carrier 330 and coupled diversion plate 340 rotation. This acceleration is controlled by the presence of oil on top of carrier 330 which dampens the rapid upward movement of the carrier 330; without such damping, coupled diversion plate 340 tends to overshift, which in turn leads to misregistration between the axial passageways 342 of the diversion plate 340 and the flowpaths that correspond to the boring and cutting nozzles in the diversion body. Hence, the presence of an adequate quantity of oil in the canister that forms the volumetric region $R_V$ of the biasing apparatus 310 is important to ensure accurate, consistent shifting of the prior art device of FIGS. 7A and 7B.

Referring again to the devices of FIGS. 1 through 6, the overall effect of the axial springs 100 on lifting the diversion plate 40 before rotation, taken in conjunction with the automated shifting action of the mode-shifting apparatus 1, is such that friction associated with the rotational forces of the mode shifting is reduced between the diversion plate 40 and the diversion body 20. As such, wear that would otherwise happen when plates are in contact with one another under pressure is reduced. Furthermore, such reduced friction allows the relative rotation among the plates to be achieved with less power. The reduced friction can also facilitate more smooth and accurate rotation that may be especially helpful in configurations where the shift takes place upon pressurization (although such lower friction may also be helpful in shifting-upon-depressurization configurations as well). As a result, no oil is required for damping purposes, enabling the fluid jet decoking tool to take advantage of an oil-free (also referred to herein as lubricant-free) mode of operation for such damping. This may simplify the construction of the mode-shifting apparatus 1 by removing or reducing the way or conditions in which oil or a related lubricant is delivered between adjacent components that are moving relative to one another. Moreover, even in situations where oil may be present in the biasing apparatus' 10 spatial volume around the pin 125 and carrier 130 to effect a proper lubricating function, the excess oil needed in the devices of FIGS. 7A and 7B for damping is done away with, thereby simplifying overall biasing apparatus 10 operation, as well as reducing the need for costly lubricant. Such a configuration promoted oil-free operation that is not possible with the device of the prior art. In the present context, an oil-free mode of operation corresponds to being able to achieve tool damping without the need for a damping fluid such as oil; such mode is not meant to imply that oil for lubricant purposes is not required. Thus, even though oil may still required to promote adequate lubrication of adjacent parts that move relative to one another, the relevant portions of a decoking tool that ordinarily may require oil as a damping fluid and are designed in accordance with the invention disclosed herein may be simplified to be oil-free relative to such damping fluids. In particular, the present inventors have found that existing fluid jet decoking tools require the oil to be "topped off" on a regular basis (the frequency being dependent on the operational site), and that a significant cause of oil loss is that associated with the oil's damping function. By contrast, the features associated with the invention discussed in the present disclosure does away with this requirement of oil (and therefore, oil topping-off or related replenishment) for damping purposes.

Figure 4A:
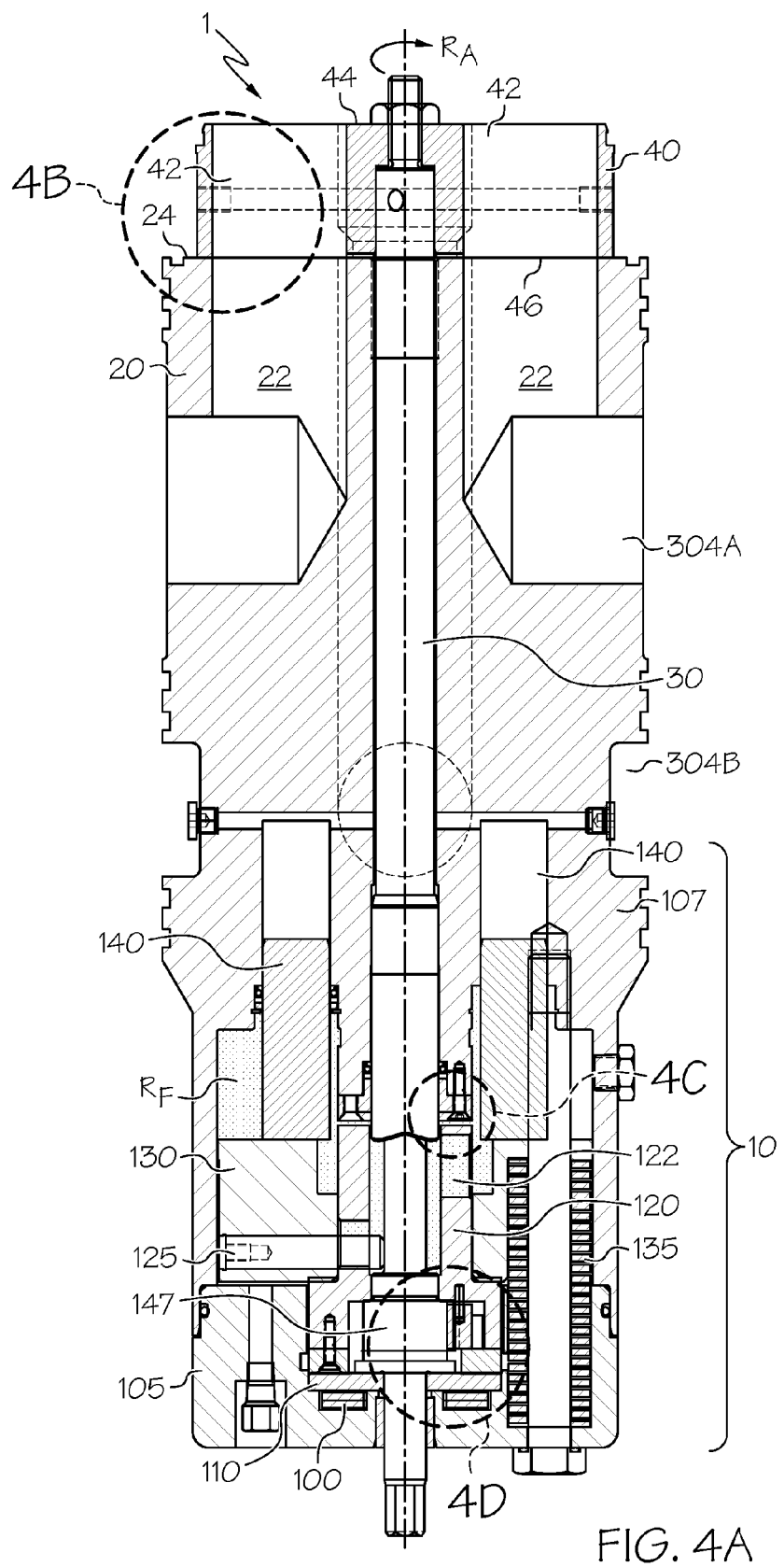
FIG. 4A-4D schematically depicts the mode shifting apparatus of FIG. 1 in a fully pressurized state according to one or more embodiments shown and described herein.
Figure 4B:
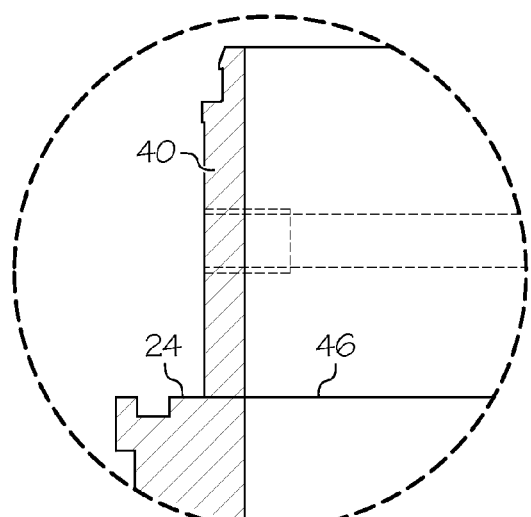
Figure 4C:
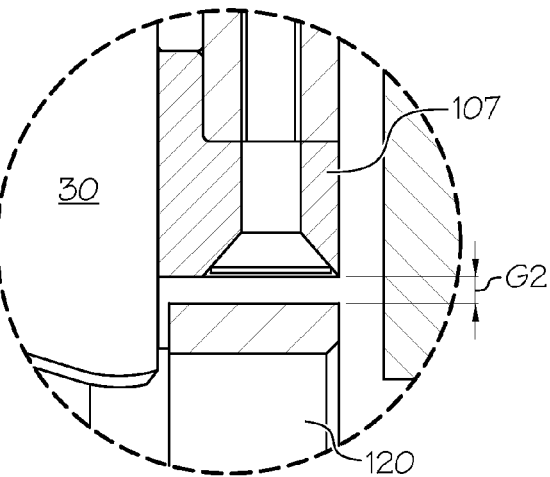
Figure 4D:
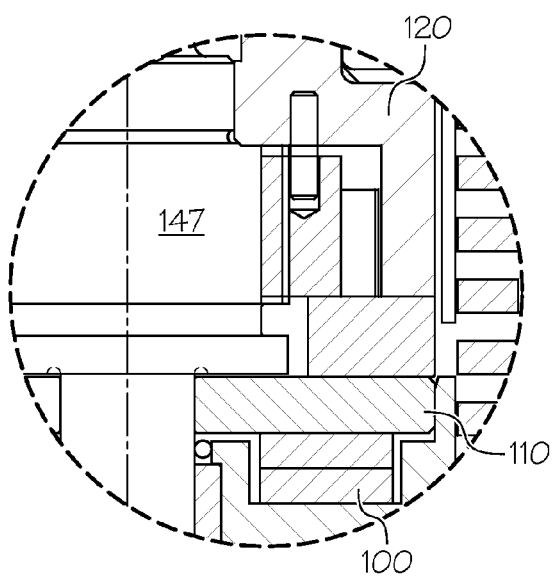

FIGS. 4A-4D show that a further increase in pressure causes the piston 140 and actuator pin carrier 130 to apply increased pressure upon the actuator sleeve 120 such that the mode-shifting apparatus 1 is in a fully (or elevated) pressurized state where the pressure is large enough to urge the actuator sleeve 120 downward towards the control rod 30 and the control rod sleeve 110, while the diversion plate 40 is also simultaneously forcing the control rod 30 against the control rod sleeve 110. Accordingly, the axial springs 100 can be compressed, as is schematically depicted in FIG. 4D. As a result, the diversion plate 40 can be move downwards towards the diversion body 20. In one embodiment, the lower surface 46 of the diversion plate 40 and the upper surface 24 of the diversion body 20 can be urged into contact, as is schematically depicted in FIG. 4B. During this time, another gap G2 can be formed between the actuator sleeve 120 and the shift body 107, as is schematically depicted in FIG. 4C.

Referring again to FIGS. 3A-3C, when the pressure starts to decrease, the axial springs 100 can move the diversion plate 40 upwards to create gap G1 (FIG. 3B), while also removing gap G2 that was above the top of actuator sleeve 120 (FIG. 4C) Likewise, the piston 140, actuator pin carrier 130 and actuator sleeve 120 can be lifted by the axial springs 100.

Referring again to FIGS. 2A-2C, further decreases in pressure causes the shifting spring 135 to push the actuator pin carrier 130 and piston 140 upwards. This in turn causes the actuator sleeve 120 to rotate (under the cooperation of actuator pin 125 and spiral groove 122) in a direction opposite the rotation R. The ratchet mechanism 147 that is situated between the control rod 30 and the actuator sleeve 120 can— by virtue of being disengaged during this part of the pressurization/depressurization sequence—allow the actuator sleeve 120 to rotate freely without engaging the control rod 30. Accordingly, the ratchet mechanism 147 can be configured to release the actuator sleeve 120 as the actuator sleeve 120 rotates during a decrease in pressure.

It is noted that, while the control rod 30 is described above as rotating during the increasing pressure portion of the pressure cycle and remaining stationary during the decreasing pressure portion of the pressure cycle, the control rod 30 may remain stationary during the increasing pressure portion of the pressure cycle and rotate during the decreasing pressure portion of the pressure cycle. For example, the rotational direction of the actuator sleeve 120 can be reversed or the direction of the ratchet mechanism 147 can be reversed. Accordingly, the diversion plate 40 can be unseated with respect to the diversion body 20, while shifting between modes (e.g., drilling and cutting modes) to reduce frictional forces and concomitantly extend the mean time between repair (MTBR) of decoking tool 200 and/or the mode-shifting apparatus 1.

Figure 5:
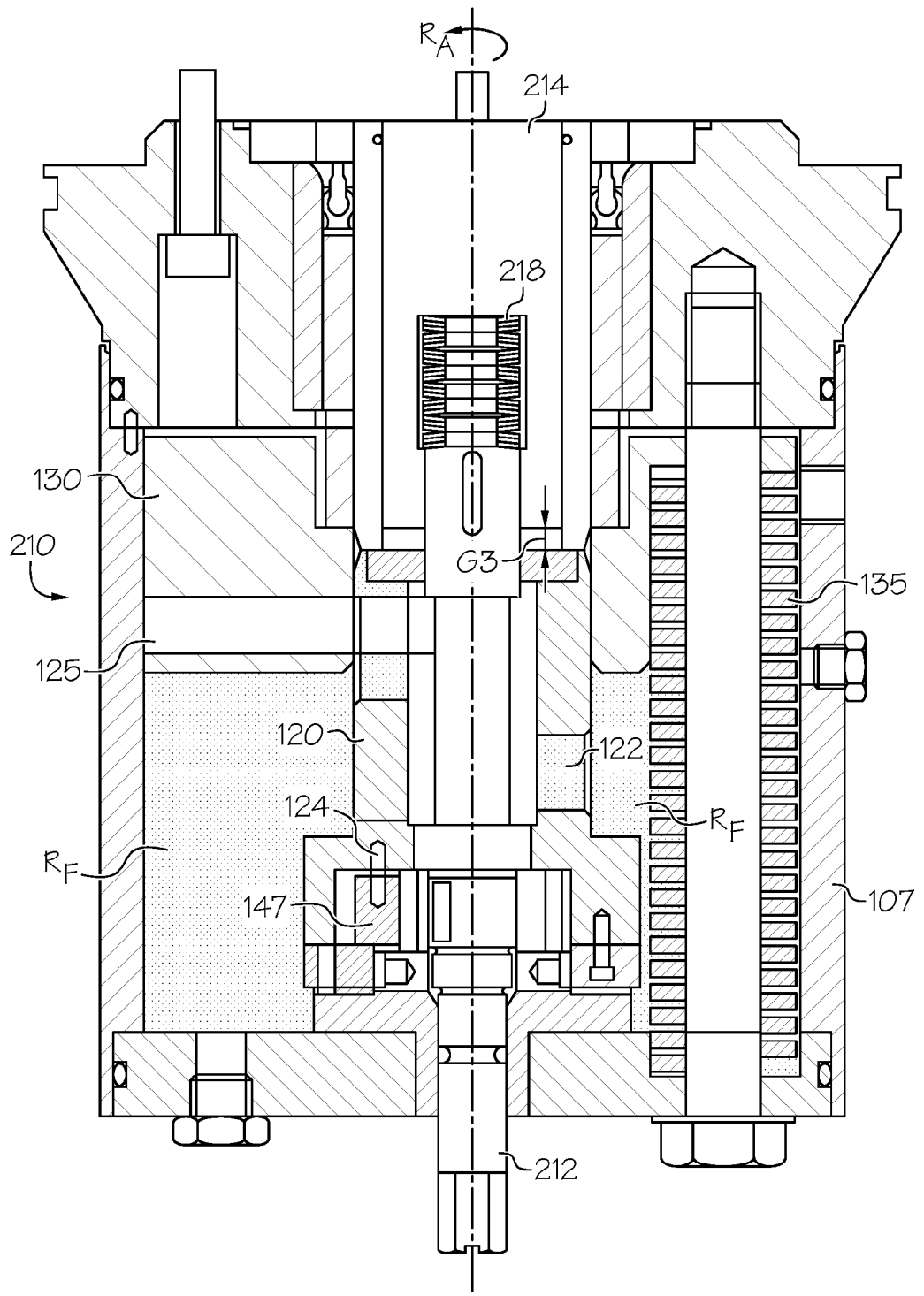
FIG. 5 schematically depicts a different embodiment of the mode shifting apparatus in a depressurized state according to one or more embodiments shown and described herein.

Referring now to FIG. 5, an alternative embodiment of the biasing apparatus 210 is schematically depicted. The biasing apparatus 210 can comprise a lower control rod 212 and an upper control rod 214 that are engaged with one another and operate in a manner analogous to the control rod 30 (FIGS. 2A-4D). Specifically, the lower control rod 212 can include a ratchet mechanism 147 that cooperates with a pawl 124 of the actuator sleeve 120, as is described herein above. The upper control rod 214 is engaged with the diversion plate 40 (not depicted in FIG. 5) such as via an extending rod. Accordingly, the diversion plate 40 can be configured to lift axially and rotate about the axis of rotation $R_A$ by the upper control rod.

The biasing apparatus 210 can further comprise one or more axial springs 218 (e.g., biasing members) disposed between the lower control rod 212 and the upper control rod 214. The spring force supplied by axial springs 218 can be configured such that the upper control rod 214 can be lifted at decoking fluid pressures less than or equal to a predetermined pressure. The upper control rod 214 can be raised by a gap G3 over its lowermost position, which in turn causes gap G1 (FIG. 2B) to separate the diversion plate 40 from the diversion body 20 (FIG. 2A). Accordingly, the spring constant of the axial springs 218 can be set such that the gap G3 is formed at a predetermined pressure that is lower than the pressure needed to compress the shifting spring 135. Specifically, when the predetermined pressure can be set to any decoking fluid pressure that is less than the decoking fluid pressure required to move the piston 140 from its upper most position. Thus, the axial springs 218 can be configured such that gap G1 (FIG. 2B) exists prior to and during any rotational motion of the diversion plate 40 (FIG. 2A).

It should now be understood that the embodiments described herein can be utilized to improve shifting between cutting and drilling modes in a decoking tool used in oil refining coke drums. Axial springs may be employed in conjunction with a shift biasing member to allow frictional forces between adjacent surfaces of a flow diversion plate and the body of the decoking tool to be reduced/eliminated through the creation of slight axial gaps prior to any rotational movement between them. By allowing the mode shifting to take place while the diversion plate and the diversion body are separated, frictional forces that occur due to the relative rotary movement between the adjacent surfaces of the diversion plate and region of the tool around the drilling and cutting passageways can be reduced, thereby simplifying operation. Accordingly, wear can be reduced during mode shifting either during depressurization or pressurization to extend tool life. Additionally, benefits of the embodiments described herein include smoother shifting, more compact arrangement, shifting at high pressures, reduced operation time and increased reliability. In one form, the pressure of the water passing through the tool may be between about 1500 pounds per square inch (psi) and an elevated about 5000 psi (or higher). In one form, such elevated pressure may be between about 4000 and 6000 psi.

Accordingly, the embodiments described herein (including axial springs 100) can allow the mode-shifting apparatus 1 to complete shifting at higher residual pressures. This in turn allows completion of the shifting in less time, and more particularly means that the decoking tool valve (DCV) will only have to go to a "prefill" position rather than to a "bypass" position, and that in so doing can increase the life of the DCV.

Figure 6:
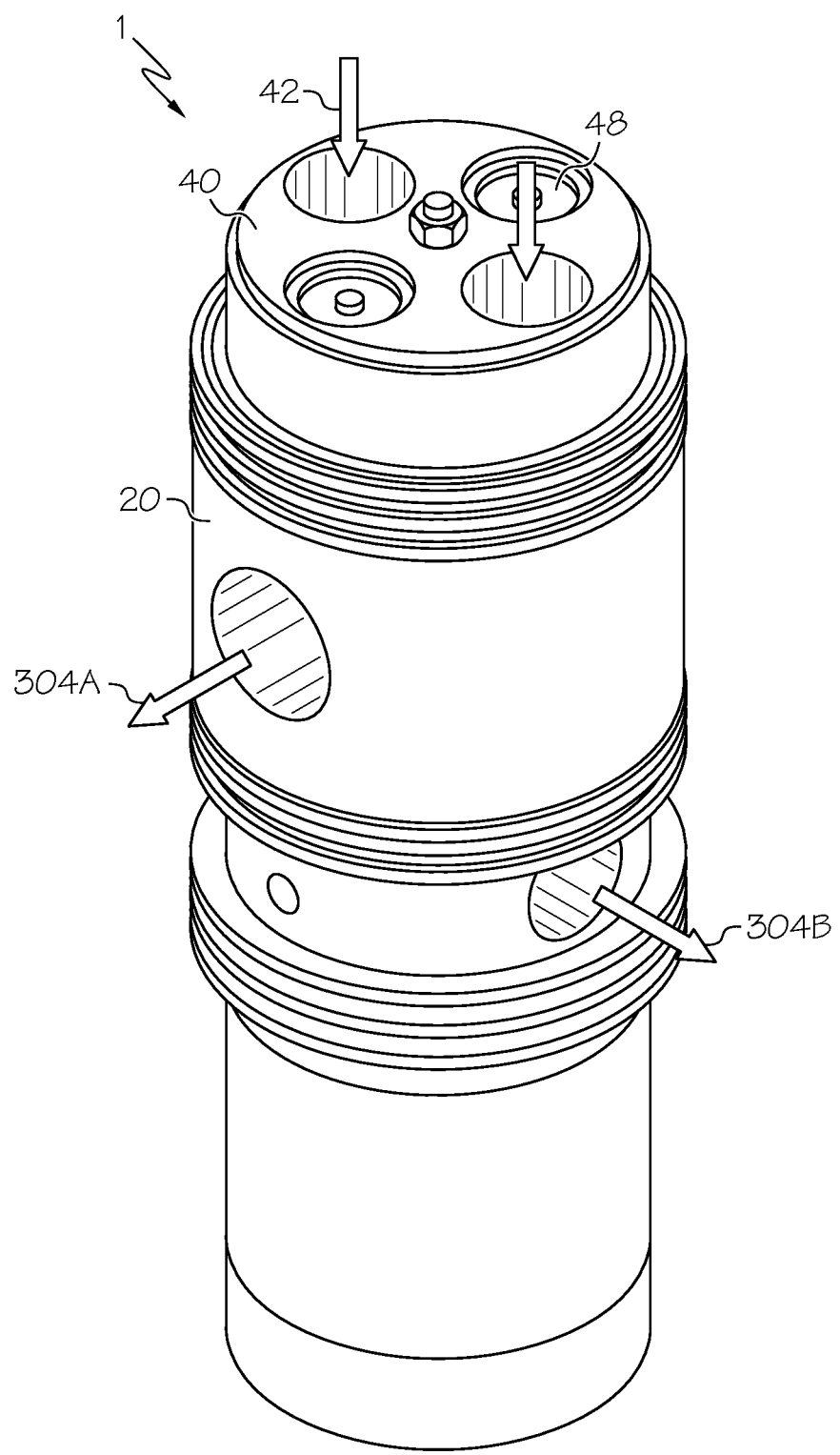
FIG. 6 shows a top perspective view of the mode-shifting apparatus of FIG. 1, highlighting the placement of orifice plates in a set of paired axial passageways formed in the diversion plate.

Referring next with particularity to FIG. 6 in conjunction with FIGS. 2A through 4C, a top perspective view of the mode shifting apparatus 1 reveals how the diversion plate 40 cooperates with the diversion body 20 in order to selectively send high pressure flow to one of the other of the cutting or boring nozzles 204A, 204B through respective flowpaths 304A and 304B. Significantly, the axial passageways 42 of the diversion plate 40 are arranged about the rotational axis of the mode shifting apparatus 1 in two sets of two diametrically-opposed holes such that one set leads to the flowpath 304A that correspond to the cut nozzles, while the other set leads to the flowpath 304B that corresponds to the bore nozzles. These paired axial passageways 42 are configured to align with the axial channels 22 on diversion body 20, where at any given time, one of the two sets may have the flow therethrough restricted by orifice plates 48. The diversion plate 40 ensures that unrestricted pressurized flow is provided to the proper set of the cutting nozzles 204A or the boring nozzles 204B. Thus, in situations where the flow of fluid is through the boring nozzles 204B, the cutting nozzles 204A—which do not need water at this stage—could be temporarily blocked during mode shifting apparatus 1 operation. To prevent any blockage, small amounts of flow at reduced pressure (through the orifice plates 48) is provided to the cutting nozzles 204A.

EXAMPLE

By way of example, a notional operating sequence associated with the pressurization and depressurization of the mode shifting apparatus 1 is discussed in more detail. The following discussion is based on the clocking movement of the mode shifting apparatus 1 taking place upon pressurization where—as mentioned above—the present inventors believe that more precise control over the movement of the diversion plate 40 relative to diversion body 20 can be achieved.

During the normal operation condition of the mode shifting apparatus 1 depicted in FIG. 4A, a typical elevated operating pressure (for example, between about 4000 and 6000 psi) results in no gap between the diversion plate 40 and the diversion body 20. Both the actuation pin carrier 130 and piston 140 are all the way down. The shift springs 135 and axial springs 100 are fully compressed, while the diversion plate 40 remains stationary (i.e., does not rotate). Decoking fluid flow proceeds freely to the cutting nozzles 204A through aligned open holes in the diversion plate 40 and diversion body 20, while the orifice plate 48 restricts decoking fluid flow to the boring nozzles 204B.

During a decreasing pressure regime, the decoking fluid pressure drops from this elevated pressure to more intermediate range. As discussed above, no gap forms yet between the diversion plate 40 and the diversion body 20, and the diversion plate 40 remains stationary. Flow continues relatively freely to the cutting nozzles 204A through the aligned openings in the diversion plate 40 and diversion body 20, while the orifice plates 48 restrict flow to the boring nozzles 204B.

During a further decrease in the pressure regime, no gap under the diversion plate 40 has yet to form, while the actuation pin carrier 130 and piston 140 remain all the way up. Shifting springs 135 are completely uncompressed, while the axial springs 100 remain compressed and the diversion plate 40 remains stationary. Decoking fluid flow continues relatively freely through the cutting nozzles 204A through the aligned openings, while the orifice plate 48 restricts flow to the boring nozzles 204B.

During an additional decrease in the pressure regime, the diversion plate 40 pops up, causing gap G1 to be formed between the diversion plate 40 and the diversion body 20. The actuation pin carrier 130 and piston 140 are all the way up such that the axial springs 100 become uncompressed. The presence of the gap G1—as well as the unseating of the orifice plates 48 from the axial passageways 42—ensures that decoking fluid flows not just to the cutting nozzles 204A, but to the boring nozzles 204B as well, as the pressurized decoking fluid has a path through all of the axial passageways 42 formed in the diversion plate 40.

During an increasing pressure regime, the decoking fluid pressure rises, causing gap G1 that was formed under the conditions mentioned in the previous paragraph to remain, while the actuation pin carrier 130 and piston 140 start moving down. The shifting springs 135 start getting compressed (although the axial springs 100 remain uncompressed), while the diversion plate 40 starts rotating under the combined influence of control rod 30, the actuation pin 125 and the ratchet mechanism 147 on the grooves 122 and the actuation pin carrier 130. Decoking fluid flow extends to both the cutting and boring nozzles 204A, 204B.

During a further increase in the decoking fluid pressure regime (for example, up to about 1000 to 6000 psi), gap G1 that is present under the diversion plate 40 remains, while the actuation pin carrier 130 and piston 140 have moved into their lowest position; in one form, this may relate to a total liner movement of about 0.75 inches. The shifting springs 135 are compressed, while the diversion plate completes its 90° rotation. The actuation pin carrier 130 is in contact with the control rod sleeve 110 through actuator sleeve 120 such that they cooperate to start compressing the axial springs 100 that are underneath the control rod sleeve 110. Decoking fluid flow continues through both the cutting and boring nozzles 204A, 204B.

During an additional increase in the pressure regime (for example, up to about 2000 psi), the previous gap G1 has disappeared, while both the actuation pin carrier 130 and piston 140 are seated in their lowermost position within the tool housing. The shifting springs 135 and axial springs 100 are likewise fully compressed, while the diversion plate 40 remains stationary. As such, any rotation of the diversion plate 40 relative to the diversion body 20 took place while gap G1 was still present, thereby avoiding any wear on the facingly-adjacent surfaces 24 and 46 of the respective diversion body 20 and diversion plate 40. Decoking fluid flows freely going to the boring nozzles 204B through the aligned open holes. The orifice plates 48 restrict the flow of the decoking fluid to the cutting nozzles 204A.

During the final increase in the pressure regime (where the decoking fluid pressure rises from to an elevated pressure (such as between about 4000 and 6000 psi), with no accompanying change in the status of the springs 135, 100 or diversion plate 40, as well as the flow of decoking fluid to the boring nozzles 204B or the restriction of flow to the cutting nozzles 204A.

Thus, in a preferred approach (where the shifting between the cutting nozzles 204A and boring nozzles 204B may take place upon pressurization of the mode-shifting apparatus 1), the lubricating flowpath or reservoir that is formed in a region $R_F$ of the biasing member 10 that permits relative movement of the actuator pin 125 and actuator pin carrier 130 is configured such that a substantial majority of an oil or related lubricating fluid placed therein does not reside in the portion of the region $R_F$ that is above the carrier 130. As mentioned above, such a configuration is deemed within the present invention to be oil-free, as it avoids the need for excess oils for damping and other non-lubricating functions. Because the rotational movement of the diversion plate 40 takes place while gap G1 is still present (avoiding surface frictional forces), mis-registration problems can be avoided without having to rely upon the presence of a damping fluid and related fluid-containing reservoir mentioned in conjunction with the prior art devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mode-shifting apparatus for use in a fluid jet decoking tool, said apparatus comprising:
   a rotatable valve cooperative with a source of pressurized decoking fluid and a plurality of nozzles on said fluid jet decoking tool to provide selective fluid communication therebetween, said rotatable valve defining a tool-engaging surface thereon;
   a control rod coupled to said rotatable valve such that said control rod and said rotatable valve rotate together;
   a shifting mechanism comprising:
      a ratcheted biasing apparatus cooperative with said rotatable valve through said control rod such that a pressure-increasing change in decoking fluid pressure within said fluid jet decoking tool produces linearly-downward and rotary movement in said rotatable valve and said control rod while a pressure-decreasing change in decoking fluid pressure within said fluid jet decoking tool produces a linearly-upward movement while not producing rotary movement in said rotatable valve and said control rod; and
      a lubricating flowpath defining a lubricating fluid reservoir such that a fluid disposed in said reservoir does not substantially contribute to damping between said rotatable valve and said decoking tool during said linearly-downward movement of said rotatable valve resulting from said pressure-increasing change in decoking fluid pressure; and a biasing member responsive to changes of said decoking fluid pressure such that said biasing member is configured to temporarily unseat said tool-engaging surface of said rotatable valve from an adjacent surface of a decoking tool during said pressure-decreasing change in decoking fluid pressure to establish a friction-reducing gap resulting from said linearly-upward movement.

2. The apparatus of claim 1, wherein said biasing member comprises at least one spring cooperative with said control rod and said rotatable valve along the axis of rotation thereof to impart linear movement thereto, said at least one spring possessive of a spring force sufficient to cause said control rod and said rotatable valve to overcome an axial force imparted thereto by said pressurized decoking fluid such that said gap is formed thereby.

3. The apparatus of claim 1, wherein said rotatable valve comprises a diversion plate that defines a plurality of axial passageways formed therein such that flow of said pressurized decoking fluid may pass through at least one of said plurality of axial passageways while being substantially inhibited from passing through at least another one of said plurality of axial passageways.

4. The apparatus of claim 1, wherein said biasing member comprises at least one spring.

5. The apparatus of claim 4, wherein said shifting mechanism is responsive to forces imparted to it by said at least one spring that operates along an axis that is substantially parallel to said axis of rotation.

6. The apparatus of claim 5, wherein said lubricating flowpath is formed in a region of said shifting mechanism that permits relative movement of at least one of an actuator pin and actuator pin carrier therein.

7. A fluid jet decoking tool comprising:
   a valve body configured to receive a pressurized fluid therein, said body comprising:
      a plurality of cutting fluid passages and a plurality of boring fluid passages formed therein and disposed about an axial centerline thereof;
      a plurality of nozzles each of which is in fluid communication with a respective one of said cutting fluid passages and said boring fluid passages; and
   a mode-shifting apparatus coupled to said valve body such that said pressurized fluid received into said valve body is selectively delivered through at least one of said plurality of nozzles, said apparatus comprising:
      a rotatable valve defining a tool-engaging surface thereon;
      a control rod coupled to said rotatable valve such that said control rod and said rotatable valve rotate together;
      a shifting mechanism cooperative with said rotatable valve through said control rod to produce selective rotary movement in said rotatable valve and said control rod, said shifting mechanism comprising:
         a ratcheted biasing apparatus cooperative with said rotatable valve through said control rod such that a pressure-increasing change in decoking fluid pressure within said fluid jet decoking tool produces linearly-downward and rotary movement in said rotatable valve and said control rod while a pressure-decreasing change in decoking fluid pressure within said fluid jet decoking tool produces a linearly-upward movement while not producing rotary movement in said rotatable valve and said control rod; and
         a lubricating flowpath defining a lubricating fluid reservoir such that a fluid disposed in said reservoir does not substantially contribute to damping between said rotatable valve and said decoking tool during said linearly-downward movement of said rotatable valve resulting from said pressure-increasing change in decoking fluid pressure;
      and
      a biasing member cooperative with said control rod to temporarily unseat said tool-engaging surface of said rotatable valve from an adjacent non-rotating surface of said valve body during a pressure-decreasing change in said pressurized fluid to establish a friction-reducing gap resulting from said linearly-upward movement.

8. The fluid jet decoking tool of claim 7, wherein said shifting mechanism is responsive to forces imparted to it by said biasing member that is in the form of at least one spring that operates along an axis that is substantially parallel to said axis of rotation.

9. The fluid jet decoking tool of claim 8, wherein said lubricating flowpath is formed in a region of said biasing apparatus that permits relative movement of at least one of an actuator pin and actuator pin carrier that make up said shifting mechanism.

* * * * *